United States Patent [19]
Muhlstadt et al.

[11] 3,934,994
[45] Jan. 27, 1976

[54] CONTROL OF THERMAL CONVECTION IN A FLOAT GLASS FORMING CHAMBER

[75] Inventors: William J. Muhlstadt, Natrona Heights; James R. Schornhorst, Pittsburgh, both of Pa.

[73] Assignee: PPG Industries, Inc., Pittsburgh, Pa.

[22] Filed: May 30, 1974

[21] Appl. No.: 474,846

[52] U.S. Cl.......... 65/65 A; 65/93; 65/99 A; 65/199; 65/182 R
[51] Int. Cl.². .................................... C03B 18/02
[58] Field of Search .......... 65/93, 199, 65 A, 99 A, 65/182 R, 325

[56] References Cited
UNITED STATES PATENTS

| | | |
|---|---|---|
| 3,223,509 | 12/1965 | Barradell-Smith et al. ......... 65/65 A |
| 3,506,422 | 4/1970 | Walters ......................... 65/182 R X |
| 3,843,346 | 10/1974 | Edge et al. ........................... 65/65 A |

*Primary Examiner*—Arthur D. Kellogg
*Attorney, Agent, or Firm*—E. Kears Pollock

[57] ABSTRACT

Thermal convection currents in the headspace above a body of glass being formed into a continuous sheet of glass while supported on molten metal are controlled to prevent the development of surface distortion patterns in the upper surface of the glass being formed. This is accomplished by establishing a series of small convection cells at least adjacent the upper surface of the glass so that the characteristic convective cooling rate for the glass in the forming chamber is substantially diminished, particularly near the inlet end of the forming chamber.

10 Claims, 2 Drawing Figures

U.S. Patent  Jan. 27, 1976  3,934,994
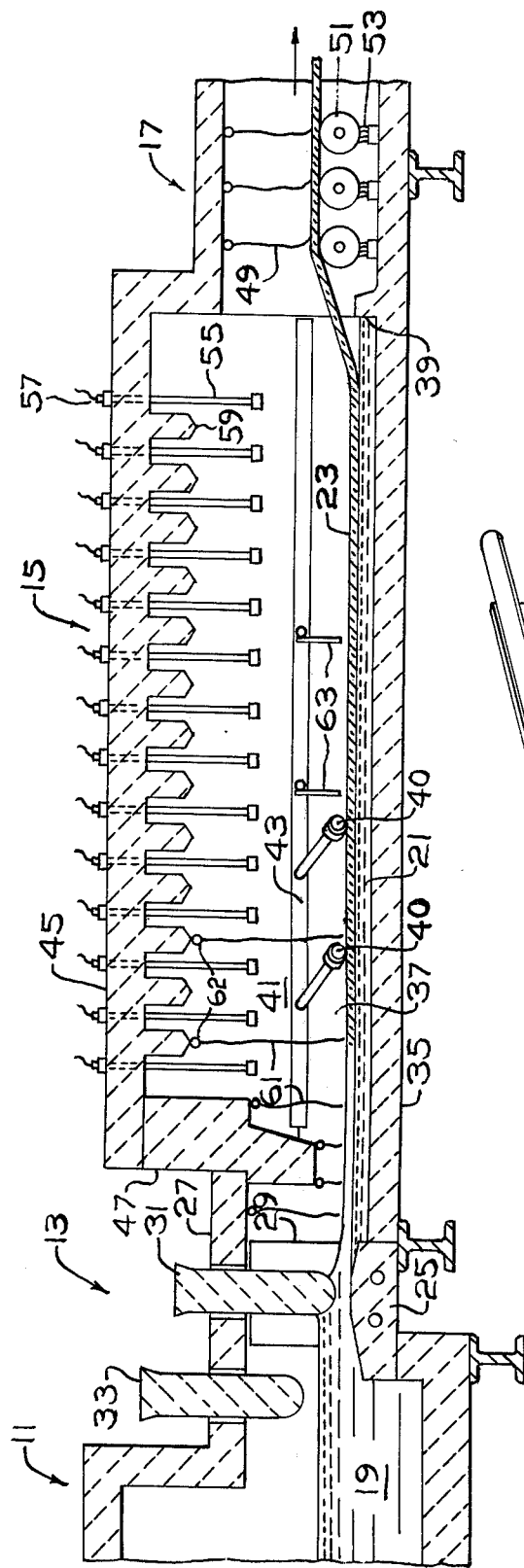
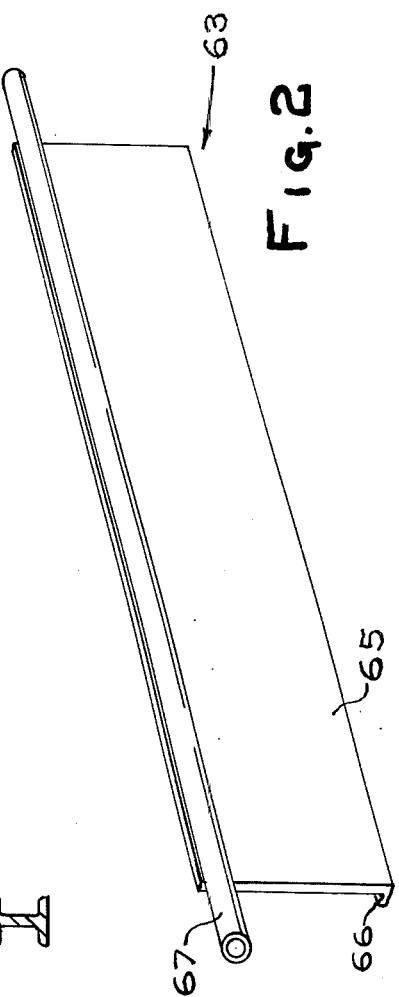

CONTROL OF THERMAL CONVECTION IN A FLOAT GLASS FORMING CHAMBER

BACKGROUND OF THE INVENTION

This invention relates to the manufacture of flat glass by forming it while supporting it on molten metal. More particularly, this invention relates to an improved method for controlling the convective cooling of the molten glass, particularly, immediately following delivery onto the molten metal for forming.

There are several well-known processes for making flat glass by forming it from a body of glass supported on molten metal. Molten glass may be delivered onto a pool of molten metal, such as molten tin, and cooled and advanced along the surface of molten metal to form a continuous sheet or ribbon of glass according to the teachings of Heal U.S. Pat. No. 710,357; of Hitchcock U.S. Pat. No. 789,911; or of Pilkington U.S. Pat. Nos. 2,911,159, 3,083,551 and 3,220,816.

From the earliest of these disclosures it has been appreciated that the temperature of the glass may be controlled while the glass is supported on the molten metal. According to Heal, "By varying the temperature in the heating chambers the flow of the sheet may be accelerated or retarded in proportion to the varying degree of fluidity of the glass." The disclosure of Hitchcock primarily concerns the division of a glass supporting molten metal bath into segregated pools so that controlled cooling of the glass may be facilitated. Hitchcock also discloses the use of burners to heat an arch roof extending over the molten glass being supported by and formed on the molten metal.

According to recent patents, workers in the art have coordinated temperature control with the application of tractive forces to glass being formed in order to produce flat glass of varying thickness. For example, U.S. Pat. No. 3,352,657 to Charnock discloses a method for making flat glass in which the glass upon delivery onto the molten metal in the forming chamber is immediately cooled at a rapid rate and thereafter remains at a substantially constant temperature for a prolonged period while applying longitudinal tractive forces to the glass at two locations and permitting the edges of the glass to be laterally unconstrained. According to this patent, flat glass of less than equilibrium thickness may be made in the manner described. Equilibrium thickness glass is flat glass having the thickness that it will attain when permitted to rest as molten glass on a pool of molten metal until it ceases to spread outwardly on the molten metal. According to the patent of Charnock, the hot glass that is supported on molten metal for forming has its temperature controlled by undefined temperature regulators located above and below the glass at locations well downstream of the inlet end of the forming chamber.

In the patent of Charnock and in U.S. Pat. No. 3,589,886 to Montgomery, there are shown radiation gates extending across float forming chambers. These gates are used to shield edge rolls or edge stretching devices located in a particular region from radiation of heat from other regions in a forming chamber. They shield such devices from heat radiated from roof portions of the forming chamber extending both upstream and downstream from the protected region. These gates permit the free movement of gases along the upper surface of glass along its entire length in the chamber.

In U.S. Pat. Nos. 3,248,197 and 3,615,315 to Michalik and Misson, it has been shown that the headspace above molten glass being formed while supported on a pool of molten metal in a forming chamber may be subdivided at its ends by providing barriers that are connected to a roof overlying the bottom portion of the chamber. This is shown with particular reference to methods for providing zones of differing atmosphere pressure within a forming chamber in order to effectuate control of the thickness of glass being produced; hence, such devices are used on conjunction with the supply of gas to the headspace under substantially superatmospheric pressures and directed at the glass being formed.

Flat glass produced by the techniques of Pilkington (including the variation of Charnock) or by techniques which are improvements of the basic Heal or Hitchcock processes, as well as techniques such as described in the patents of Michalik and Misson, have generally good optical quality. Such glasses are generally optically flatter than flat glasses produced by so-called sheet processes, such as the Pittsburgh process, the Colburn process or the Fourcault process. That is, these glasses are not characterized by optical distortion as intense as that which characterizes sheet glasses. Nevertheless, flat glass produced by supporting it on molten metal during forming is characterized by some optical distortion. This is more evident in thin glasses than in thick glasses, particularly equilibrium glass, and it is more evident when glass is observed at a small angle by reflected light rather than at an angle at about 90° by transmitted light. The optical distortion is variously called "batter", "broken line distortion" and "reflective distortion".

The optical distortion in flat glass may be qualitatively evaluated by observing a shadow projection of the glass using a point-light source aimed perpendicularly at a target screen and positioning the glass at an angle with respect to the target screen so that an image of the glass is projected onto the screen. The optical distortion may also be observed in Schlerin photographs of the glass. The optical distortion pattern is regular, repetitive and isotropic in glass produced by methods like that of Pilkington wherein the glass falls onto the molten metal and spreads outwardly and then is drawn inwardly again. In glass produced in the manner of Hitchcock following horizontal delivery onto motlen metal while maintaining its width substantially unchanged, the distortion pattern is regular, repetitive and anisotropic. In both types of glass the distortion may be sufficiently intense (that is, the variation of lightness to darkness and the projected shadow is great) to be easily observed by even an untrained eye when the glass is coated with a reflected coating and observed by reflected light.

The optical distortion apparent in flat glass is recognized as an effect that may be caused by variations in the surfaces of the glass. If the surfaces are not perfectly flat, but rather are characterized by a plurality of elevations and depressions, a beam of light passing through the glass will be bent or distorted. This optical distortion in the glass may be detected during production, using a device such as that disclosed and claimed by Simko in U.S. Pat. No. 3,799,679 or determining the surface variation of a sheet of glass from its optical characteristics in the manner described in U.S. Pat. No. 3,792,930 to Obenreder. The present invention provides a method for making glass of improved optical quality having distortion of diminished intensity.

SUMMARY OF THE INVENTION

A series of sheet-like barriers are mounted inside a glass forming chamber to extend transversely across the headspace above a pool of molten metal in the forming chamber. The bottom of each barrier is positioned slightly above the upper surface of the molten metal. Glass passing beneath the barrier while supported for forming on the molten metal, passes sufficiently close to the bottom of the barrier so that the movement of gases in the headspace of the chamber between the barrier and the glass is substantially eliminated. The barriers divide or separate the forming chamber into a series of smaller chambers or zones. In each of these zones a small convection cell of gas flow is established.

The barriers preferably extend across the forming chamber from its roof to just above the upper surface of the molten metal so that each provides a substantially complete barrier across the headspace from the roof of the chamber down to the position for movement of glass. Alternatively, the barriers may extend from the vicinity of the glass up into the headspace only a short distance with the upper portion of the headspace being in free comunnication throughout the chamber above the barrier. A combination of barriers may be provided with the barriers closest to the inlet end of the forming chamber preferably being barriers that extend completely across the headspace and completely from the vicinity of the chamber roof down to a location just above the upper surface of molten metal and with the barriers at locations farther downstream in the forming chamber closer its discharge end being of the smaller size.

The barriers are positioned sufficiently close to one another so that the characteristic Nusselt number descriptive of the rate of convective heat transfer from the glass to the atmosphere in each convection cell is maintained at a value significantly below the characteristic value for a Nusselt number descriptive of convective cooling for the forming chamber as a whole if no barriers were provided.

As a layer of molten glass is conveyed along the surface of a pool of molten metal to form it into a continuous dimensionally stable ribbon of glass, it is successively exposed to discrete convective cooling zones. In each of these discrete convective cooling zones, a convection flow is established which is independent of the convective flow in the next adjacent cooling region at least in the space immediately adjacent the glass. The size of each of the discrete cooling zones is such that the Nusselt number descriptive of the convective flow cell that develops in each zone is maintained at a value substantially below the value of a Nusselt number that would be descriptive of convective cooling over the full length of the forming chamber were it not divided or segregated into discrete convective cooling regions or zones.

The convective cooling zones closest the hot end of a forming chamber (that is, the end where molten glass is received into the forming chamber and onto the molten metal for forming) are smaller than the convective cooling zones in the vicinity of the cold or exit end of the forming chamber where the formed continuous sheet of glass is removed from the molten metal.

The convective flow cells in the cooling zones of the bath generally extending from the location where molten glass is discharged onto the molten metal for at least about 10 to about 30 percent of the overall length of the forming chamber are preferably characterized by Nusselt numbers that are lower than those characterizing convective flow cells in the cooling zones in the middle one-third to one-half length of the forming chamber which, in turn, are preferably characterized by Nusselt numbers that are lower than the Nusselt numbers descriptive of the flow cells in the cooling zones in the final third of the forming chamber.

The characteristic Nusselt number, which is conveniently employed to define the preferred sizes of the convective flow cells in a forming chamber, is defined according to the following conventionally accepted relationship for relative convective and conductive heat transfer in a gaseous medium.

$N_u = (h\,H)/\kappa$

The Nusselt number in this environment is now considered to be a function of the Grashof number, the Prandtl number and an aspect ratio descriptive of the headspace in the forming chamber above the molten glass on the molten metal. The form of this relationship is conveniently expressed as follows:

$N_u = a(Gr)^b(Pr)^c(A)^d$

In this equation the Grashof number has its usual and conventional meaning, that is, $Gr = (\rho^2 g\,\beta \Delta T\,H^3)/\mu^2;$ The Prandtl number also has its usual and conventional meaning, that is $Pr = (\mu C_p)/\kappa;$ and the aspect ratio descriptive of the headspace of the forming chamber has the following meaning:

$A = H/L.$

In these relationships the individual terms have the following meanings:

$\rho$ is the average mass density of the gases in the forming chamber headspace, since these gases are protective gases, primarily nitrogen with a small amount of hydrogen, the density is available in standard tables for a full range of temperatures;

g is the gravitational constant;

$\beta$ is the volumetric expansion coefficient for the gases;

$\Delta T$ is the difference in gas temperature between the hot end and the cold end of a convective cooling zone or between the hot end and cold end of a forming chamber as the case may be;

H is height of the forming chamber or cooling zone as the case may be;

$\mu$ is the average viscosity of the gases;

$C_p$ is the heat capacity of the gases;

$\kappa$ is the thermal conductivity of the gases;

h is the convective heat transfer coefficient between the glass and the gases in the headspace;

L is the length of a cooling zone or the forming chamber as the case may be;

a, b, c, and d are experimentally determined constants, all positive, with b being greater than d.

The individual relationships which are conventionally known dimensionless numbers characteristic of heat transfer generally are discussed at length in the following text: TRANSPORT PHENOMENA, R. B. Bird; W. E. Stewart and E. N. Lightfoot, J. Wiley and Sons, Inc., New York, N.Y. (1960, 62) Library of Congress Catalog Card No. 60-11717.

In the practice of this invention it is preferred that the Nusselt number be maintained below about 1200 and more preferably below about 900, particularly when making glass that is significantly thinner than equilibrium thickness glass, especially glass on the order of one-eighth inch thick or thinner.

The present invention is preferably practiced by the use of convection barriers which are convenient for installation in a forming chamber and comprise elements that may be conveniently adjusted within the forming chamber in order to controllably alter the convective cooling within the chamber.

Two types of barriers or curtains are preferred for use when practicing this invention. One type of barrier is a barrier that extends from the roof region of a forming chamber downwardly to an elevation at or just above the intended elevation for the upper surface of a layer of glass being supported by and formed into a continuous sheet on a pool of molten metal in the forming chamber. Such barriers preferably extend across the full width of the forming chamber. They should at least extend beyond the marginal edges of a layer of glass being formed. They may extend downwardly far enough to engage the top surface of the glass, in which case they are preferably made of flexible material. However, it is greatly preferred that they extend to an elevation just above the surface of glass so that there is no possibility of marking the glass due to contact with a barrier.

The preferred barriers comprise flexible material, such as asbestos cloth, fiberglass cloth or the like. Such barriers may be supported on fixed mountings or may be rollably mounted on rotatable rolls so that they may be adjusted upwardly or downwardly depending upon particular production needs. A preferred supporting assembly comprises a pipe about which the cloth barrier may be rolled. The assembly may be inserted into a forming chamber through either of its side walls by providing small, sealable openings for that purpose. Once inserted into the forming chamber, the assembly may be rotated so that the barrier or curtain can be lowered to a suitable position for practicing the invention.

Short barriers also may be conveniently employed in the practice of this invention. They are particularly useful at locations well downstream from the hot end of a forming chamber. They are also useful in the immediate vicinity of the hot end of a forming chamber, particularly beneath a flat arch or lintel at the entrance of a forming chamber. These shortened barriers extend from a location on the order of two to three feet above the molten tin down to a location just above the molten metal so that their bottom surfaces are not engaged by glass passing beneath them. For convenience of installation, each of these barriers comprises a transverse bar or other support member, such as a pipe, to which the barrier itself is connected. Each may be extended into a forming chamber by passing it through an opened side seal connecting a suspended top portion of a forming chamber with its bottom-molten metal containing portion and then by rotating it into position so that the barrier extends downwardly from the support member while extending transversely across the forming chamber. This divides the headspace in the forming chamber immediately above the molten metal while the headspace above the side seal in the vicinity of the roof of the chamber is maintained in communication throughout its length over the barriers. A preferred short barrier comprises a water-cooled pipe on which there is mounted a metal sheet barrier, for example, a stainless steel barrier.

This invention will be further understood with reference to the accompanying drawings.

BRIEF DESCRIPTION OF THE DRAWINGS

FIG. 1 is a longitudinal, sectional elevation view of a glass forming chamber connected to a glassmaking furnace through a glass discharge or delivery facility with the forming chamber divided according to this invention, and FIG. 2 is a perspective view of a preferred short barrier.

DESCRIPTION OF THE PREFERRED EMBODIMENTS

Referring first to FIG. 1, there is seen a glassmaking furnace 11 to which there is connected a molten glass delivery facility 13 which in turn is connected to a flat glass forming chamber 15 having at its downstream end a continuous glass sheet lift-out and conveying facility 17. It is the exit or discharge end of the glassmaking furnace 11 that is shown. This is the end of a refining or conditioning zone of the furnace. Within the glassmaking furnace is a pool of molten glass 19. It is from this pool of molten glass that a layer of molten glass is delivered to the forming chamber 15 for forming into a continuous sheet of glass.

Within the flat glass forming chamber 15 there is a pool of molten metal 21 which acts as a support liquid to support molten glass delivered to the forming chamber while it is cooled and conveyed along the surface of the pool of molten metal 21 to form a dimensionally stable, continuous sheet of glass 23, which can then be removed from the pool of molten metal by the lift-out facility 17.

The molten glass delivery or discharge facility 13 includes a subsurface threshold member 25 which supports molten glass as a layer or stream of molten glass during its withdrawal from the pool of molten glass 19 and delivery onto the pool of molten metal 21. The top surface of the threshold 25 is at or just above the top surface of the pool of molten metal so that glass delivered over the threshold onto the molten metal is delivered in a substantially horizontal path that is either perfectly horizontal or comprises a slightly downward slope. This combination of elements assures that molten glass is continuously supported during delivery.

The molten glass delivery facility also includes a roof portion 27 that extends over the threshold region of the furnace 11 immediately upstream of the threshold and the region at the forming chamber immediately downstream of the threshold. The roof is preferably of flat arch construction. The delivery facility also includes side members or jambs 29 which define the width of an opening through which molten glass may be withdrawn from the furnace and delivered to the forming chamber. These extend upwardly from the ends of the threshold 25 to the roof 27. Extending down from the roof towards the threshold is an adjustable metering member or tweel 31 which extends transversely across the intended path of glass movement through the delivery facility. This tweel extends downwardly to engage the upper surface of molten glass in the pool of molten glass 19 and may be adjusted upwardly or downwardly to vary the space between the bottom of the tweel 31 and the top of the threshold 25. This controls the depth (height) of the opening through which molten glass may be delivered across the threshold 25. A backup tweel 33 may be provided upstream of the adjustable tweel used for flow control purposes.

The forming chamber 15 comprises a top portion and a bottom portion. The bottom portion is preferably supported from below and the top portion is suspended from above. The bottom portion of the forming chamber comprises a bottom 35, bottom side walls 37 and an exit end lip 39 which, together with the threshold 25, constitute a vessel for holding the pool of molten metal 21 in the forming chamber. The bottom portion of the forming chamber may be provided with edge rolls 40 or other force-applying apparatus for adjusting or controlling the width and thickness of glass being formed.

The top portion of the forming chamber includes top side walls 41, which are connected to the bottom side walls 37 by a side seal 43, which includes individual components that may be removed to provide access to the inside of the forming chamber. The top portion of the forming chamber further includes a roof 45 and a lintel 47 extending transversely across the entrance or hot end of the forming chamber. This lintel 47 may be designed to support the downstream portion of the delivery facility roof 27.

The glass lift-out and conveying facility 17 includes an exit end seal comprising curtains 49 which are designed to prevent the ingress of undesired materials, particularly oxygen, into the forming chamber. A continuous sheet of glass may be lifted from the pool of molten metal 21 and conveyed out from or withdrawn from the forming chamber by lift-out rolls 51, which comprise part of the lift-out facility 17. These rolls are provided with seals 53.

The forming chamber is provided with a series of radiant heating elements 55 having connections 57 for connection to a source of electrical power (not shown). These heating elements are used to control the rate of glass cooling in the forming chamber. Since the glass is cooled by transfer of heat to the upper portion of the forming chamber, any increase in the roof temperature may be used to diminish the rate of heat transfer from the glass to it and conversely a decrease in roof temperature may be used to increase heat transfer to it. The roof structure includes roof tiles 59 which act, in part, as heat absorbers for heat radiated to the roof portion of the forming chamber and tend to act as thermal ballast, providing a uniform target for heat radiation from the molten glass.

Not only does the glass give up heat to the roof of the forming chamber by radiation, but also it is cooled by convective heat transfer to the gaseous atmosphere within the headspace defined by the upper portion of the forming chamber and the bottom portion of the forming chamber that extends above the glass. This gaseous atmosphere is, of course, preferably a protective atmosphere to prevent the oxidation of the molten metal upon which the glass is supported. In the absence of any convective flow barriers, a large convection cell develops in a forming chamber because the entrance end of the chamber is substantially hotter than the exit end of the chamber. Gases tend to rise toward the roof in the entrance end of the chamber and descend toward the glass in the exit end of the chamber. This causes a flow of gases countercurrent to the direction of glass movement through the chamber immediately adjacent the glass and cocurrent with its movement along the roof.

In a forming chamber having a large temperature difference between its hot end and its cold end, the velocity of the gases adjacent the glass is sufficient to cause excessive convective cooling of the glass at its surface. This cooling can be so great that the glass at the surface develops a substantially stiffer, more viscous character than glass immediately subjacent the surface. Apparantly due to this, compressive forces develop within the glass near the surface of the molten glass. These forces appear to be a primary cause of batter distortion in the top surface of the glass. This batter distortion is characterized as periodic depressions and elevations in the upper surface of the glass.

This problem is worse in short forming chambers than in long ones. When the length of a forming chamber is less than about 50 times its height, convective cooling caused batter is noticeable. The quality of glass produced in such a forming chamber may be improved by practicing this invention. In a forming chamber having a length that is less than about twenty times its height, practice of this invention appears essential if glass of commercially acceptable optical quality is to be produced. Thus, this invention may be viewed as a key to the production of highquality glass in significantly shorter forming chambers than those found practical for use in the past. By practicing this invention, forming chambers as short as 5 to 10 feet, for example, appear practical for the production of flat glass. Such forming chambers can be constructed and operated with considerably less expense than can typical current forming chambers that are on the order of 200 feet in length.

When employing an extremely short forming chamber, it is necessary to retard the rate of convective heat transfer from the glass to the atmosphere significantly in order to avoid the highly-objectionable batter effect.

According to the present invention, the headspace above the pool of molten metal in the forming chamber is subdivided into a series of discrete regions or zones, each having a length on the order from ¼ of the height of the chamber to 2 times the height of the chamber. This breaks up the convective flow within the gaseous atmosphere above the pool of molten metal and permits the overall length of the forming chamber to be quite short. By practicing this invention, glass can be adequately cooled to prevent its marking upon removal from the pool of molten metal without extending the length of the forming chamber to a length that is typical of common commercial float glass forming chambers which are on the order of about 200 feet long.

The barriers 61 comprise flexible refractory cloth, preferably asbestos cloth or silica cloth, which depend from supporting members extending transversely across the forming chamber. These are mounted at their ends through the upper side walls 41 or, alternatively, are mounted on the roof tile 59. A preferred support member is simply a pipe about which the refractory cloth is rolled. This pipe may be rotated to raise or lower the barrier attached to it. It is found desirable to install such barriers in a forming chamber and keep the barriers rolled up during the startup of glass forming in the chamber and then lower them after stable forming has been achieved.

The barriers 63 extend down from the elevation of the side seal 43 to just above the layer of glass being formed into a continuous sheet of glass. These barriers preferably comprise a supporting pipe 67 which has a metal sheet, preferably a stainless sheet 65, welded to the pipe 67. They are inserted through a removed section of the side seal 43 with the plate in a horizontal position and then turned downwardly so that they extend transversely across the forming chamber.

This invention will be further understood from the example which follows:

A soda-lime-silica glass having the following composition is formed into a continuous sheet of flat glass.

| Constituent | Initial |
|---|---|
| | (Percent by Weight) |
| $SiO_2$ | 72.93 |
| $Na_2O$ | 13.63 |
| $K_2O$ | 0.02 |
| $CaO$ | 8.64 |
| $MgO$ | 3.80 |
| $Al_2O_3$ | 0.12 |
| $SO_3$ | 0.23 |
| $Fe_2O_3$ | 0.08 |

Glass batch is melted, refined and discharged for forming at a rate of about 50 to 60 tons per day. The forming chamber to which the molten glass is delivered has an inside length of about 40 feet and an inside height (surface of molten tin to roof tile spacing) of about 3 feet. The headspace of the forming chamber contains nitrogen and hydrogen which are continuously fed to it through the roof of the chamber.

Molten glass is delivered to the forming chamber as a thin, wide layer or stream over a submerged threshold and beneath an adjustable tweel. The space between the tweel and the threshold is varied to control the rate of molten glass delivery and is generally kept within the range from about 1.5 inch to about 2.5 inch. The width of the opening through which the layer of glass flows is about 6 feet. The width of the continuous sheet of glass produced is also about 6 feet, with the width of glass during forming varying little. Edge rolls or machines are used and sufficient tractive force is applied to the glass to produce a continuous sheet having a thickness of about ⅛ inch.

The molten glass is delivered to the forming chamber at temperatures within the range from about 1950°F. to about 2150°F. with the usual delivery temperature about 2050°F. The glass is cooled to a temperature within the range from about 1050°F. to about 1250°F. for lift-off and removal from the pool of molten tin in the forming chamber.

During two extended periods of operation (several days duration) glass is produced without convection barriers in the chamber. During two other extended periods of operation, glass is produced while two full-height convection barriers are disposed across the chamber near its hot end. One is positioned across the chamber a distance of about 4 feet from the tweel and threshold and the second about 8 feet from the tweel and threshold. The quality of glass produced in each of the four periods is visually and quantitatively evaluated. The glass produced with the barriers in place is of significantly better quality than that produced with no barrier in place. During these periods of operation radiation reflectors, such as disclosed by D. L. Cramer in his copending, commonly assigned application filed on even date herewith, were from time to time placed in the forming chamber. Their beneficial effects were noted as complementing the beneficial effects of practicing this invention, as well as improving performance even when making glass without barriers in the forming chamber.

The convective heat transfer from the glass in the first 8 feet of the forming chamber is determined from temperatures of the glass between the tweels and in the forming chamber at locations about 4 feet downstream from the tweel and about 8 feet downstream from the tweel. Temperatures of the atmosphere gases, the roof, the tin and the refractory walls and bottom of the furnace are measured to segregate the total glass heat loss into its separate parts, namely, heat loss through the bottom surface of the glass to the tin, and the heat through top surface of the glass to the roof and to the gases of the atmosphere. Based upon heat transfer from the glass and the thermodynamic properties of nitrogen (the principal gas in the chamber atmosphere) the convective and conductive heat transfer rates are determined, as is the Nusselt number characteristic of the region of interest in the forming chamber.

The glass quality is found to be strongly dependent upon convective cooling rate as seen in the following summary of data for the four periods of operation.

| Time Period | Without Barriers | | With Barriers | |
|---|---|---|---|---|
| | 1 | 2 | 3 | 4 |
| Total heat transfer Rate (Btu/hour/foot$^2$) | 11500 | 10700 | 8100 | 7000 |
| Convective heat transfer Coefficient = h (Btu/hour/foot$^2$/°F.) | 27 | 31 | 22.5 | 18.5 |
| Nusselt Number (Dimensionless) | 1370 | 1550 | 1135 | 910 |
| Distortion Sum | 66 | 56 | 22 | 23 |
| Distortion Peak | 35 | 29 | 11 | 12 |
| Zebra Board Angle (Degrees) | 54 | 50 | 60 | 55 |

The optical distortion measurements are made across the width of the glass sheet using a distortion analysis device similar to that described by Obenreder in U.S. Pat. No. 3,792,930.

The distortion sum units are equivalent to 0.05 diopter-inch or 0.13-centimeter per meter based on a standard 22-inch scan length. The distortion peak units are each equivalent to 0.002 dioper.

The Zebra board angle is the angle a specimen of glass may be placed with respect to a planar surface having thereon a series of straight lines and positioned perpendicular to a viewer's line of sight when the lines become distorted (bent) as viewed through the glass. The glass is midway between the planar surface and the viewer. If the glass were a perfect optical flat, it could be turned to 90° without causing distortion. This test is simple and expedient, though less precise and more subjective than the distortion analysis.

Larger Zebra angles indicate better quality glass, and smaller distortion sums and peaks indicate better quality glass. To the untrained eye the glass of time periods 1 and 2 is obviously objectionable, while that of time periods 3 and 4 is of apparently excellent quality.

The barriers employed in this invention may be provided with gutters as shown in FIG. 2 for diverting to the sides of the chamber condensed impurities or foreign material settling on them from the atmosphere. Also the bottom of a barrier may be shaped to provide more space beneath its central portion than beneath its marginal portions. This permits closing off the space between the glass and the barrier very closely with little risk of contacting the central region of the glass with the barrier.

Although this invention has been described according to particularly preferred embodiments, those skilled in the art will recognize that these embodiments are merely illustrative of the invention and are not intended to limit its scope.

We claim:

1. In a method of making flat glass wherein molten glass is delivered onto a pool of molten metal in an enclosed chamber having a roof extending over the pool of molten metal providing a headspace between the roof and the pool of molten metal, which headspace is filled with a gaseous atmosphere; wherein, following its delivery, the glass is advanced along the surface of the pool of molten metal from an inlet end of the chamber to an outlet end of the chamber and, while being so advanced, is cooled and subjected to tractive forces whereby the glass is formed as a dimensionally stable, continuous sheet of glass; and then removing the dimensionally stable, continuous sheet of glass from the pool of molten metal and from the enclosed chamber, the improvement which comprises a. positioning a plurality of barriers in the headspace above the advancing glass in a region of the chamber extending from its inlet end to a location where the advancing glass is dimensionally stable such that each barrier is extended substantially across the headspace transverse to the advance of the glass and is extended from adjacent the roof downwardly into a sufficiently closely spaced relation with the advancing glass to prevent substantial gas flow beneath the barrier along the glass and such that the spacing between adjacent barriers of said plurality of barriers is from one-fourth to twice the height of the chamber headspace between the surface of the pool of molten metal and the roof; and
   b. removing sufficient heat from the chamber between adjacent barriers to establish a convective flow of gases in the headspace between adjacent barriers that is substantially less intense than the flow of gases in the headspace of the chamber in the absence of such barriers;

whereby the rate at which the advancing glass is cooled following its delivery onto the pool of molten metal and prior to its reaching dimensional stability is sufficiently low to yield a continuous sheet of glass having observably less optical distortion than that of glass produced in the absence of such spaced barriers.

2. The method according to claim 1 wherein the molten glass is delivered as a layer onto the pool of molten metal along a substantially horizontal path maintained at substantially the same elevation as the surface of the pool of molten metal.

3. The method according to claim 1 wherein the discrete convection cells established in the portion of the space closest the location of glass delivery thereto are established and maintained to be smaller than the discrete convection cells established in the portion of the space extending from a location about one-third of its length from the location of glass delivery to the location of glass sheet removal.

4. The method according to claim 1 wherein adjacent barriers are spaced sufficiently closely to one another and sufficient heat is removed from the chamber between them to provide a convective flow condition between them which is characterized by a Nusselt number below 1200 yet sufficient to provide for the glass to be cooled to dimensional stability in the forming chamber.

5. In a glassmaking apparatus including a glass forming chamber having an inlet end and an outlet end containing a pool of molten metal for supporting glass during forming in the chamber and having a substantially enclosed upper portion enclosing a headspace for containing a gaseous atmosphere over the pool of molten metal, means for delivering molten glass onto the pool of molten metal at the inlet end of the chamber, means for advancing delivered glass along the surface of the molten metal, means for cooling of the glass for forming a continuous sheet of glass from the molten glass and means for removing the continuous sheet of glass from the chamber at its outlet end, the improvement comprising:

a plurality of barriers positioned in a region of the chamber extending from its inlet end one-third of its length toward its outlet end, each barrier extending transversely across the chamber and being sufficiently closely spaced from the pool of molten metal to prevent the substantial flow of gases along the length of the chamber parallel to the intended direction of glass advance, with adjacent barriers being spaced from one another a distance of from about ¼ to about 2 times the height of the chamber headspace.

6. The apparatus according to claim 5 including means for delivering molten glass as a layer along a substantially horizontal path onto the pool of molten metal wherein said molten glass delivery means is connected to the forming chamber at a location so that the path for molten glass delivery is at substantially the same elevation at the surface of the pool of molten metal.

7. The apparatus according to claim 5 wherein each barrier extends to within about one-eighth inch to about one inch from the surface of the pool of molten metal.

8. The apparatus according to claim 5 wherein the barrier is flexible.

9. The apparatus according to claim 5 wherein the barrier is provided with means for raising and lowering its lower extremity.

10. The apparatus according to claim 5 wherein the length of the chamber is less than about 20 times its height.

* * * * *